US012754303B2

(12) United States Patent
Billy et al.

(10) Patent No.: US 12,754,303 B2
(45) Date of Patent: Oct. 6, 2026

(54) METHOD FOR ACTIVATING A VEHICLE FUNCTION AND ASSOCIATED ACTIVATION DEVICE

(71) Applicant: Continental Automotive Technologies GmbH, Hannover (DE)

(72) Inventors: Stéphane Billy, Grenade (FR); Sylvain Godet, Saint Cezert (FR)

(73) Assignee: Continental Automotive Technologies GmbH, Hannover (DE)

( * ) Notice: Subject to any disclaimer, the term of this patent is extended or adjusted under 35 U.S.C. 154(b) by 99 days.

(21) Appl. No.: 18/921,230

(22) Filed: Oct. 21, 2024

(65) Prior Publication Data

US 2025/0138174 A1 May 1, 2025

(30) Foreign Application Priority Data

Oct. 31, 2023 (FR) ...................................... 2311851

(51) Int. Cl.
*G01S 13/04* (2006.01)
*E05B 81/78* (2014.01)
*G01S 13/02* (2006.01)

(52) U.S. Cl.
CPC ............. *G01S 13/04* (2013.01); *E05B 81/78* (2013.01); *G01S 13/0209* (2013.01)

(58) Field of Classification Search
CPC ...... G01S 13/04; G01S 13/0209; E05B 81/78; G07C 9/00309; B60R 25/245
See application file for complete search history.

(56) References Cited

U.S. PATENT DOCUMENTS

2018/0009416 A1* 1/2018 Maiwand ........... G07C 9/00896
2018/0254910 A1* 9/2018 Dutz ................. H04W 12/0431
(Continued)

FOREIGN PATENT DOCUMENTS

ID P202307288 A * 9/2023
WO 2022214482 A1 10/2022

OTHER PUBLICATIONS

Notification of RRP with no obligation to reply and Preliminary Research Report with machine translation mailed on Jul. 17, 2024 by the French Patent Office in corresponding French Patent Application No. FR2311851. (18 pages).

*Primary Examiner* — Rufus C Point
(74) *Attorney, Agent, or Firm* — Buchanan Ingersoll & Rooney PC

(57) ABSTRACT

A method for activating a vehicle function using an activation device, having at least two transceivers communicating with a portable user appliance and communicating with each other via ultra-wideband communication. The method includes: transmitting using a first transceiver; computing a radius of a circle centered around the first transceiver as a function of the time of flight of the waves reflected by the portable appliance, and determining a perimeter of the circle; comparing a profile of received reflected waves originating from the second transmitter with a predetermined received wave profile; detecting a presence as a function of the result of the comparison; computing, if a presence is detected, a distance between the second transceiver and the presence; locating the portable appliance by computing an intersection between the distance and the perimeter; and activating the vehicle function as a function of the location.

8 Claims, 4 Drawing Sheets

(56) References Cited

U.S. PATENT DOCUMENTS

| | | | | |
|---|---|---|---|---|
| 2022/0236363 | A1* | 7/2022 | Vaccariello | G01S 5/0284 |
| 2023/0194696 | A1 | 6/2023 | Benbouhout et al. | |
| 2024/0329239 | A1* | 10/2024 | Wu | B60Q 9/00 |
| 2025/0324259 | A1* | 10/2025 | Singh | H04W 12/122 |

* cited by examiner

METHOD FOR ACTIVATING A VEHICLE FUNCTION AND ASSOCIATED ACTIVATION DEVICE

CROSS REFERENCE TO RELATED APPLICATIONS

This application claims priority to French Patent Application No. 2311851, filed Oct. 31, 2023, the contents of such application being incorporated by reference herein.

FIELD OF THE INVENTION

The invention relates to a method for activating a function of a motor vehicle and an associated activation device. The invention particularly, but in a by no means limiting manner, applies to the function of hands-free access to a motor vehicle, i.e., to the function of locking and unlocking the opening elements of a motor vehicle.

BACKGROUND OF THE INVENTION

In a motor vehicle, it is known practice to use vehicle function activation devices that can detect the presence of a hand or of a foot of a user of the vehicle and thus allow all or some of the opening elements of the vehicle, for example, the doors or the trunk, to be locked or unlocked. By way of an example, the detection of the presence of a hand of a user on or in front of a door handle in conjunction with the recognition of an identifier of a "hands-free" access appliance carried by this user allows these opening elements to be locked and unlocked.

A "hands-free" access system for accessing a motor vehicle allows an authorized user to lock and/or unlock the opening elements of their vehicle without having to physically press buttons on a key. For this purpose, the vehicle identifies a portable appliance such as a fob or a remote control or even a key carried by the user and, if the fob or the remote control or indeed the key is located in a predetermined area around the vehicle or in the vehicle and is identified as belonging to the vehicle, then the vehicle automatically locks/unlocks its opening elements according to the intention of the user, without the user having to physically manipulate a key.

To this end, when the user approaches the vehicle, communication is established over a wireless communication link between the "hands-free" access appliance, for example, an electronic fob or a smart phone, and the vehicle function activation device in order to authenticate said access appliance by virtue of its identifier.

To this end, the activation device comprises at least one radio frequency antenna for receiving the identifier sent by the "hands-free" access appliance. The activation device is connected to an electronic computer of the vehicle ("ECU": abbreviation for "Electronic Control Unit"), to which it transmits the identifier.

According to the prior art, the access appliance is generally an electronic fob. The signal received by the antenna of the activation device, comprising the identifier of the access appliance, is transmitted via RF (radio frequency) or LF (low-frequency) waves. The precise location of the portable appliance around the vehicle is found by measuring the strength of the LF signal received by the portable appliance (via the antennas and the electronic control unit) originating from the vehicle, the strength measurements are more commonly called RSSI (Received Signal Strength Indication) measurements. The measurement of the strength of each signal received by the portable appliance originating from each antenna of the plurality of LF antennas located on the vehicle V is received and analyzed by an activation device, installed in the vehicle, which thus determines, using triangulation, the position of the portable appliance with respect to said LF antennas, i.e., with respect to the vehicle.

According to the location of the portable appliance identified by the vehicle, in said location areas, certain actions that are specific to said location areas are performed automatically: unlocking/locking or preliminarily turning on the lighting in the passenger compartment (also called welcome lighting).

Nowadays, however, it is increasingly common to use a cell phone to perform authentication functions, which avoids having to use a dedicated electronic fob and thus limits the number of appliances. The majority of cell phones do not possess RF or LF communication means. Therefore, the "hands-free" start-up and/or access system for a vehicle needs to be adapted in order for it to also be able to function with a cell phone equipped with other communication standards, such as, for example, ultra-wideband, or BLE (Bluetooth Low Energy®), or Wi-Fi (Wireless Fidelity) communication and no longer only using radio waves and low-frequencies (RF and LF). Ultra-wideband (UWB), in particular, is a radio modulation technique that is based on transmitting very short duration pulses, often less than a nanosecond. Thus, the passband may reach very large values.

The approach of the access appliance in the vicinity of (less than 2 m away from) the activation device and the recognition of the identifier received by the computer, in conjunction with the detection of the hand of the user, allows the door to be locked or unlocked.

The disadvantage of using UWB communication means is the location precision of the access appliance (cell phone or fob), which is worse compared to when low-frequency 125-kHz communication means of the prior art are used.

This is because ultra-wideband is more sensitive to reflections and interference. Thus, precise location involves equipping the vehicle with six to eight UWB transceivers (four to six on the outside of the vehicle and two on the inside of the vehicle), so that three UWB transceivers are always visible to the access appliance, whereas at low frequency, according to the prior art, a single visible transceiver is able to precisely locate the access appliance. The result of this increase in the number of UWB transceivers on the vehicle is an undesirable additional cost of the activation device.

It is not possible to reduce the number of UWB transceivers on the vehicle to three or four without running the risk of the activation device often being in blackspots, particularly when the user approaches the vehicle to unlock it and the device is only visible to one transceiver. In this case, unlocking cannot be triggered.

The disadvantage for the user is considerable because certain functions will not be activated, for example, automatic "hands-free" unlocking or automatic "hands-free" locking of the vehicle, when the user enters the unlocking or locking area.

An aspect of the invention therefore proposes a vehicle function activation method and an associated activation device that overcome the disadvantages of the prior art, more particularly that allow reliable and precise location of the access appliance.

SUMMARY OF THE INVENTION

An aspect of the invention relates to a method for activating a vehicle function using an activation device intended to be fitted on board a vehicle, comprising at least two ultra-wideband transceivers located on either side of an opening element and on the same side of the vehicle, separated by a predetermined distance and capable of communicating with a portable user appliance, the method being characterized in that the two transceivers are adapted so that they can communicate with each other via ultra-wideband communication, and in that it comprises the following steps:

a. transmitting ultra-high-frequency waves using at least one first transceiver;
b. receiving reflected waves originating from the portable appliance and determining a time of flight of the waves;
c. computing a radius of a circle centered around the first transceiver as a function of the time of flight, and determining a perimeter of said circle on which the portable appliance may be located;
d. receiving reflected waves originating from the second transceiver;
e. comparing a profile of received waves over time with a predetermined received wave profile;
f. detecting a presence in a predetermined area around the two transceivers as a function of the result of the comparison;
g. computing, if a presence is detected, a distance between the second transceiver and said presence;
h. locating the portable appliance as a function of the computation of an intersection between said computed distance and the previously determined perimeter;
i. activating the vehicle function as a function of said location.

Preferably, the received wave profile corresponds to an impulse response per channel and a presence is detected by the presence of two consecutive peaks in said response.

An aspect of the invention also relates to a device for activating a vehicle function that is intended to be fitted on board a vehicle, comprising at least two ultra-wideband transceivers located on either side of an opening element, separated by a predetermined distance and located on the same side of the vehicle, capable of communicating with a portable user appliance, the device being characterized in that the two transceivers are capable of communicating with each other, and in that it further comprises:

a. means for determining a time of flight of reflected waves originating from the portable appliance;
b. means for computing a radius of a circle centered around the first transceiver as a function of the time of flight, and for determining a perimeter of said circle on which the portable appliance may be located;
c. means for comparing a profile of reflected waves originating from a second transmitter with a predetermined received wave profile;
d. means for detecting a presence in a predetermined area around the two transceivers as a function of the result of the comparison;
e. means for computing a distance between the second transceiver and said presence;
f. means for locating the portable appliance as a function of the computation of an intersection between said computed distance and the previously determined perimeter;
g. means for activating the vehicle function as a function of said location.

Advantageously, the received wave profile corresponds to an impulse response per channel and the means for detecting a presence are capable of detecting two consecutive peaks in said response.

An aspect of the invention also relates to any computer program product comprising program code instructions for executing the steps of the method according to any one of the aforementioned features, when said program is executed on a computer.

Finally, an aspect of the invention relates to any motor vehicle comprising an activation device according to any one of the aforementioned features.

BRIEF DESCRIPTION OF THE DRAWINGS

Further features and advantages of aspects of the invention will become more clearly apparent upon reading the following description. This description is purely illustrative and should be read with reference to the appended drawings, in which.

DETAILED DESCRIPTION OF EXEMPLARY EMBODIMENTS

Figure 1:
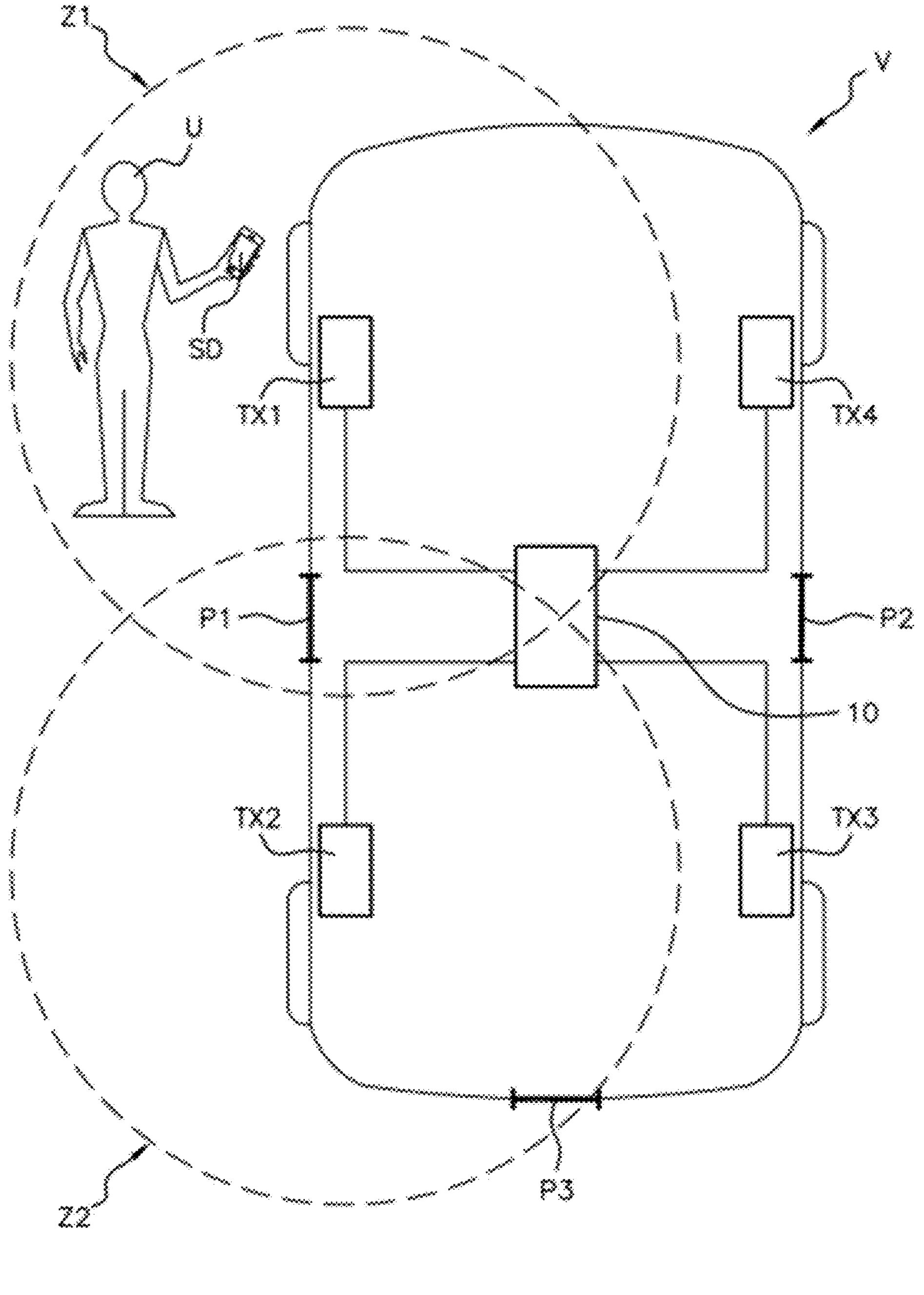
FIG. 1 schematically shows a motor vehicle equipped with the activation device according to an aspect of the invention.

FIG. 1 shows a motor vehicle V comprising an activation device D for activating a vehicle function according to an aspect of the invention. The activation device D according to an aspect of the invention allows:

a. detection of the presence of a user U in a predetermined area around the vehicle V;
b. authentication of the portable access device SD carried by the user, in order to activate a vehicle function.

"Vehicle function" is understood to mean locking/unlocking the opening elements of the vehicle V, such as the door of the driver or the rear trunk of the vehicle V, but also switching on heated seats, switching on ceiling lighting ("welcome lighting"), or even pre-adjusting seats or pre-tuning a radio station, even before the user U has entered the vehicle.

FIG. 1 shows a motor vehicle V equipped with an activation device D for activating a vehicle function according to an aspect of the invention. The activation device D comprises at least two UWB transceivers Tx1, Tx2, Tx3, Tx4 capable of communicating via ultra-wideband communication with a portable access appliance SD, for example, a smart phone or an electronic key carried by a user U.

The activation device D further comprises a central control unit 10 electronically connected to the transceivers Tx1, Tx2, Tx3, Tx4.

This central control unit 10 allows the transmission and reception of UWB data to be managed by means of the transceivers. This is known in the prior art and will not be described in further detail herein.

Ultra-wideband (UWB) communication is understood to mean radio frequency communication that is based on the transmission of very short duration impulses, often lasting less than one nanosecond. Thus, the bandwidth can reach very high values between 250 and 500 MHz and beyond. It should be noted that an aspect of the invention also applies to any other communication means allowing a broadband signal to be obtained, for example, Wi-Fi, which uses an OFDM (Orthogonal Frequency Division Multiplexing) type modulation, i.e., a method for coding digital signals by distributing orthogonal frequencies in the form of multiple sub-carriers.

According to an aspect of the invention, the transceivers Tx1, Tx2, Tx3, Tx4 are located in an element of the bodywork oriented toward the outside of the vehicle V in order to transmit toward the outside of the vehicle V on the side where the user approaches the vehicle V. According to an aspect of the invention, at least two transceivers Tx1, Tx2 are located on the same side of the vehicle, and on either side of an opening element, in this case a door P1 that the user wishes to unlock, i.e., close to an element of the bodywork that the user wishes to approach.

In the example illustrated in FIG. 1, the two transceivers Tx1, Tx2 are located on either side of a door P1, located on the driver side of the motor vehicle V. The transceivers Tx1, Tx2 each comprise, in a manner known per se, an ultra-wideband (UWB) antenna and ultra-wideband transmission and reception means that are not described or shown herein, which are known in the prior art.

As explained above, the user U approaching the vehicle may not be "seen" by all the transceivers Tx1, Tx2, Tx3, Tx4 located on the vehicle.

In this case, as illustrated in FIG. 1, when the user U arrives from the front of the vehicle V, they are only seen by a first transceiver Tx1 located closest to them because they are located in its transmission area Z1. However, they are not seen by the second transceiver Tx2, located on the other side of the door P1, because they are not located in its transmission area Z2.

With respect to the other two transceivers Tx3, Tx4 located on the other side of the vehicle V, either they are too far away to communicate with the portable appliance SD carried by the user U, or the various reflections and obstacles between said transceivers Tx3, Tx4 and the portable appliance SD encountered by the waves transmitted or received by these two transceivers Tx3, Tx4 mean that locating the portable appliance based on these two transceivers is neither reliable nor robust.

Therefore, an aspect of the invention proposes an activation device capable of overcoming the disadvantages of the prior art.

To this end, according to an aspect of the invention, the two transceivers Tx1, Tx2, which are located on the same side of the vehicle and on either side of an opening element, are capable of communicating with each other via ultra-wideband communication.

Furthermore, still according to an aspect of the invention, the activation device D comprises:

a. means M1 for determining a time of flight of reflected waves originating from the portable appliance SD, transmitted by the first transceiver Tx1;

b. means M2 for computing a radius of a circle centered around the first transceiver as a function of the time of flight, and for determining a perimeter of said circle on which the portable appliance may be located;

c. means M3 for comparing a profile of reflected waves originating from a second transmitter with a predetermined wave profile;

d. means M4 for detecting a presence in a predetermined area around the two transceivers as a function of the result of the comparison;

e. means M5 for computing a distance between the second transceiver and said presence;

f. means M6 for locating the portable appliance as a function of the computation of an intersection between said computed distance and the previously determined perimeter;

g. means M7 for activating the vehicle function as a function of said location.

The means M1 for determining a time of flight are capable of computing the round-trip time, also called the TOF ("Time of Flight"), of the waves between the first transceiver Tx1 and the portable appliance SD. This is known to a person skilled in the art. The time of flight thus computed can be used to determine a distance separating the first transceiver Tx1 from the portable appliance SD.

Based on this distance, the computation means M2 determine the perimeter of a circle centered around the first transceiver Tx1, the radius R of which is equal to the distance previously computed based on the time of flight TOF. The portable appliance SD can be located at any point on said perimeter C.

The comparison means M3 then compare a profile of the received waves originating from the second transceiver Tx2, transmitted by the first transceiver Tx1, with a predetermined received wave profile. The received wave profile in this case is the CIR or "Channel Impulse Response". The comparison means M3 comprise means for determining the parameter called CIR ("Channel Impulse Response"), i.e., means for measuring received waves sampled as a function of time t. It should be noted that either the amplitude of the CIR or the phase of the CIR can be used. In this example, the frequency measurements of the received waves are transformed via an inverse Fourier transform in order to generate values in units of time. The amplitude of the CIR is made up of the absolute value of the real and imaginary parts of the values in units of time. The phase of the CIR is made up of the arc tangent of the ratio of the imaginary part divided by the part of the values in units of time. The computation of the amplitude or of the phase of the CIR are well known to a person skilled in the art and will not be described in further detail herein. The profile of the CIR over time can be used to detect any object or presence likely to reflect the emitted waves. Thus, a peak in the CIR profile either corresponds to waves directly received in the line of sight, with no obstacle, or to waves that have been received but that have been reflected by an obstacle in their path.

According to an aspect of the invention, the predetermined received wave profile comprises a single peak, corresponding to the presence of the second transceiver Tx2, which reflects the waves.

Figure 2:
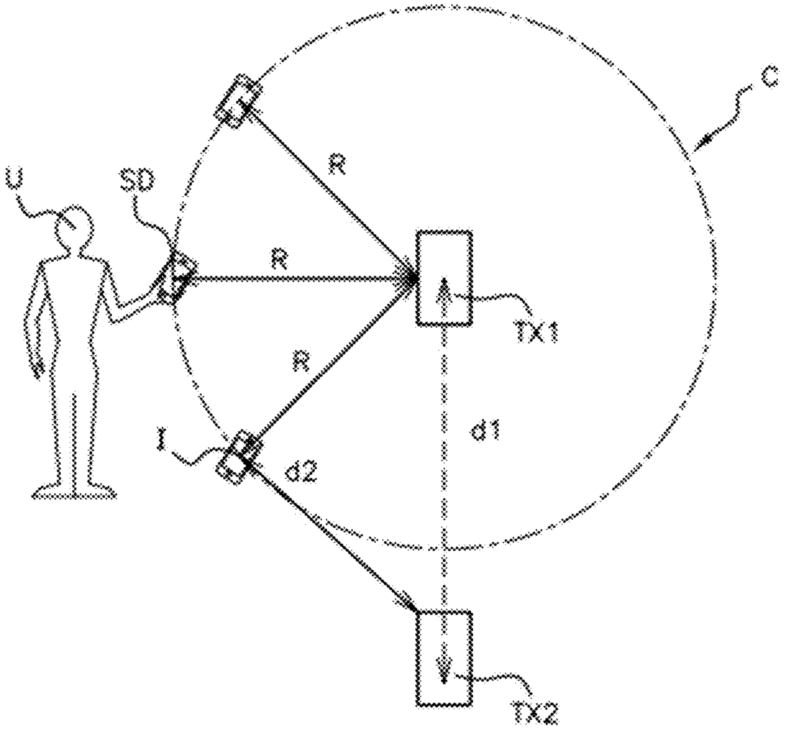
FIG. 2 illustrates the intersection point I according to the activation method of an aspect of the invention.

If there is a presence in the vicinity of the two transceivers Tx1, Tx2, said presence will reflect the waves and thus create a second peak on the profile of the CIR, the detection means M4 then detect a presence in a predetermined area around the two transceivers Tx1, Tx2. As the two transceivers Tx1, Tx2 are separated by a predetermined distance d1 (see FIG. 2), it is thus possible to use the CIR and the time of appearance of the first peak and the second peak to determine a distance D' separating the second transceiver Tx2 from the presence.

Figure 5:
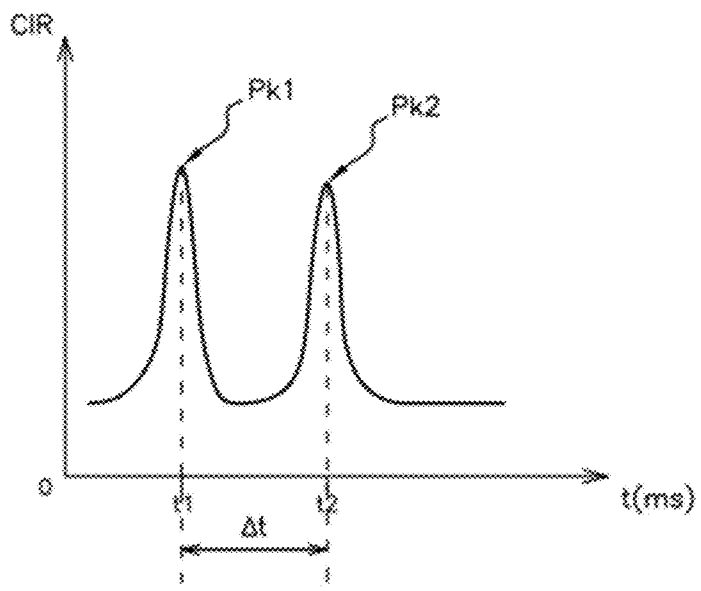
FIG. 5 is a graph showing the impulse response per channel as a function of time in the case whereby a presence is located between the two transmitters.

This is illustrated in FIG. 5, which is a graph showing the power spectral density of the propagation channel or the impulse response per channel, i.e., CIR as a function of time t. This type of representation of the CIR is known to a person skilled in the art and will not be described in further detail herein.

At the first instant t1, there is a first peak Pk1 of reflected waves, which corresponds to the waves reflected by the second transceiver Tx2. The first instant therefore corresponds to the round-trip time of flight of the waves required to travel twice the distance d1 separating the two transceivers Tx1, Tx2.

At the second instant t2, there is a second peak Pk2 of reflected waves, which corresponds to the waves reflected by a presence located around two transceivers Tx1, Tx2. The computation means M5 determine a distance d2 between the second transceiver Tx2 and said presence based on the delay Δt between the first instant t1 and the second instant t2.

Once the perimeter of the circle around the first transceiver Tx1 on which the portable appliance SD may be located is determined and the distance d2 separating the presence from the second transceiver Tx2 is computed, the means for locating the portable appliance SD determine an intersection point I on the circle located at a distance d2 from the second transceiver Tx2.

According to an aspect of the invention, this intersection point I is considered to be the position of the portable appliance SD.

The activation means M7 trigger the activation of the vehicle function, in this example unlocking the driver door P1, according to the position I of the portable appliance SD.

The means M1 for determining a time of flight of waves, the means M2 for computing a radius of a circle centered around the first transceiver, the means M3 for comparing a profile of reflected waves originating from a second transmitter with a predetermined wave profile, the means M4 for detecting a presence in a predetermined area around the two transceivers as a function of the result of the comparison, the means M5 for computing a distance between the second transceiver and said presence, the means M6 for locating the portable appliance as a function of the computation of an intersection between said computed distance and the previously determined perimeter, and the means M7 for activating the vehicle function as a function of said location are preferably in the form of software integrated into a printed circuit located in the central control unit 10.

Figure 3:
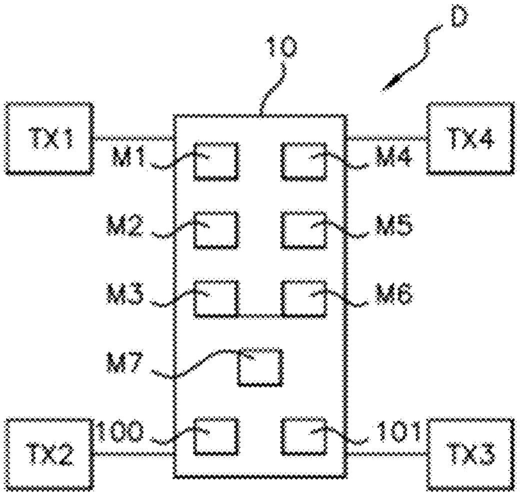
FIG. 3 schematically shows the activation device according to an aspect of the invention.

The central control unit 10 also comprises a processor 100 and a memory 101 (see FIG. 3) that stores instructions allowing the processor to be configured to execute certain particular processing operations, and notably to implement the steps of the activation method, according to the embodiment described hereafter.

Figure 4:
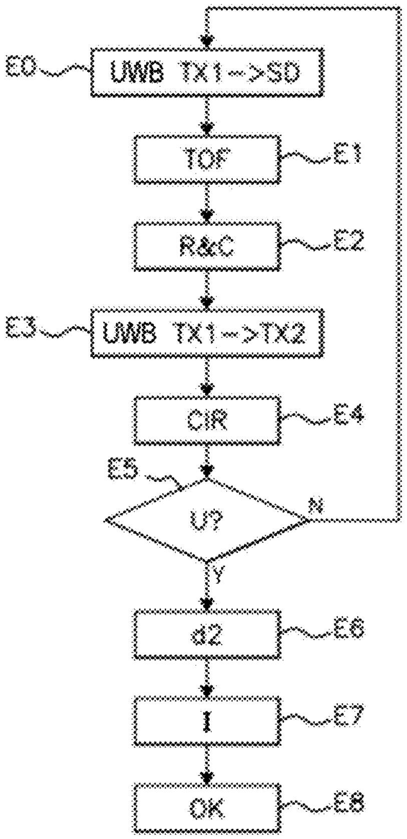
FIG. 4 is a flowchart showing the various steps of the activation method according to an aspect of the invention.

The activation method, illustrated in FIG. 4, will now be described. This method illustrates the function for activating and unlocking the driver door P1 of the vehicle V, but can be applied to other vehicle functions, or to other opening elements, such as the right front door P2, or the trunk P3 (see FIG. 2).

During a first step E0, the first transceiver Tx1 emits ultra-wideband (UWB) waves. These waves are then received and reflected by a portable access appliance SD located in the emission area of said first transceiver Tx1.

Once the waves have been received by the first transceiver Tx1, a time of flight, TOF, of the waves is computed (step E1).

Then, based on the time of flight, a distance separating the first transceiver Tx1 from the portable appliance is determined. Based on this distance, a perimeter C (see FIG. 2) of a circle around said transmitter Tx1 is defined (step E2), the radius R of which is equal to said distance. It is then assumed that the portable access appliance SD can be located at any position on this perimeter.

In the next step, step E3, the waves emitted by the first transceiver Tx1 are simultaneously received by the second transceiver Tx2.

A CIR profile of the received waves originating from the second transceiver Tx2 is then determined and is compared (step E4) with a predetermined received wave profile comprising only a single peak Pk1 corresponding to the second transceiver Tx2 likely to reflect the waves.

If a second peak Pk2 is detected on the CIR profile corresponding to the reflection of a presence located in a predetermined area around the two transceivers Tx1, Tx2 (step E5), then a distance d2 (step E6) separating the second transceiver Tx2 from said presence is computed as a function of a delay Δt between the two peaks Pk1 and Pk2.

Then, according to an aspect of the invention, an intersection point I is determined between the perimeter C of the circle and a segment of length d2 having the second transceiver Tx2 as its origin (step E7). According to an aspect of the invention, the position of this intersection point I is considered to be the position of the access appliance SD.

Depending on the position of this intersection point I and whether it belongs to a predetermined area authorizing the activation of certain vehicle functions, one or more vehicle functions, such as unlocking the door P1, is/are activated (step E8).

An aspect of the invention thus ingeniously allows the position of the portable appliance SD to be determined, even when it is only visible to a transceiver Tx1, simply by using the reflection of the waves induced by the presence of the user carrying said appliance and its effect on the received wave profile when the two transceivers communicate with each other.

An aspect of the invention is especially noteworthy in that it requires limited resources, in this case software resources, which are easy to implement and are inexpensive.

The invention claimed is:

1. A method for activating a vehicle function using an activation device intended to be fitted on board a vehicle, comprising at least two ultra-wideband transceivers located on either side of an opening element and on the same side of the vehicle, separated by a predetermined distance and capable of communicating with a portable user appliance, wherein the two transceivers are adapted so that they can communicate with each other via ultra-wideband communication, the method comprising:

a) transmitting waves by at least one first transceiver;

b) receiving reflected waves originating from the portable appliance and determining a time of flight of the waves;

c) computing a radius of a circle centered around the first transceiver as a function of the time of flight, and determining a perimeter of said circle on which the portable appliance may be located;

d) receiving reflected waves originating from the second transceiver;

e) comparing a profile of the reflected waves received over time with a predetermined received wave profile; and f) detecting a presence in a predetermined area around the two transceivers as a function of the result of the comparison;

i) computing, if a presence is detected, a distance between the second transceiver and said presence;

ii) locating the portable appliance as a function of the computation of an intersection between said computed distance and the previously determined perimeter; and iii) activating the vehicle function as a function of said location.

2. The activation method as claimed in claim 1, wherein the received wave profile corresponds to an impulse response per channel and in that a presence is detected by the presence of two consecutive peaks in said response.

3. A device for activating a vehicle function that is intended to be fitted on board a vehicle, comprising at least two ultra-wideband transceivers located on either side of an opening element, separated by a predetermined distance and located on the same side of the vehicle, capable of communicating with a portable user appliance, wherein the two transceivers are capable of communicating with each other via ultra-wideband communication, the device further comprising:

a) means for determining a time of flight of reflected waves originating from the portable appliance;

b) means for computing a radius of a circle centered around the first transceiver as a function of the time of flight, and for determining a perimeter of said circle on which the portable appliance may be located;

c) means for comparing a profile of received reflected waves originating from a second transmitter with a predetermined received wave profile;

d) means for detecting a presence in a predetermined area around the two transceivers as a function of the result of the comparison;

e) means for computing a distance between the second transceiver and said presence;

f) means for locating the portable appliance as a function of the computation of an intersection between said computed distance and the previously determined perimeter; and g) means for activating the vehicle function as a function of said location.

4. The activation device as claimed in claim 3, wherein the received wave profile corresponds to an impulse response per channel and in that the means for detecting a presence are capable of detecting two consecutive peaks in said response.

5. A non-transitory computer-readable medium storing program instructions which, when executed by one or more processors, cause the one or more processors to execute the method as claimed in claim 1.

6. A motor vehicle comprising an activation device as claimed in claim 3.

7. A motor vehicle, comprising an activation device as claimed in claim 4.

8. A non-transitory computer-readable medium storing program instructions which, when executed by one or more processors, cause the one or more processors to execute the method as claimed in claim 2.

* * * * *